United States Patent
Burns et al.

(10) Patent No.: US 7,200,110 B1
(45) Date of Patent: Apr. 3, 2007

(54) METHOD AND APPARATUS FOR PRIORITIZED RELEASE OF CONNECTIONS IN A COMMUNICATIONS NETWORK

(75) Inventors: John C. Burns, Kanata (CA); Jonathan L Bosloy, Kanata (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/275,097

(22) Filed: Mar. 24, 1999

(51) Int. Cl.
| | |
|---|---|
| *G01R 31/08* | (2006.01) |
| *G06F 11/00* | (2006.01) |
| *H04L 12/26* | (2006.01) |
| *H04L 1/00* | (2006.01) |
| *H04J 3/14* | (2006.01) |
| *H04J 3/04* | (2006.01) |

(52) U.S. Cl. ..................... 370/225; 370/536
(58) Field of Classification Search ........ 370/216–221, 370/225–228, 235–237, 535–536
See application file for complete search history.

(56) References Cited

U.S. PATENT DOCUMENTS

| | | | | |
|---|---|---|---|---|
| 4,901,314 | A * | 2/1990 | Lohrbach ....................... 714/4 |
| 5,065,399 | A * | 11/1991 | Hasegawa et al. .......... 370/228 |
| 5,140,585 | A * | 8/1992 | Tomikawa ................... 370/354 |
| 5,235,599 | A * | 8/1993 | Nishimura et al. .......... 370/218 |
| 5,444,693 | A * | 8/1995 | Arslan et al. ................ 370/221 |
| 5,515,363 | A * | 5/1996 | Ben-Nun et al. ............ 370/232 |
| 5,548,639 | A * | 8/1996 | Ogura et al. ............ 319/221.04 |
| 5,717,689 | A * | 2/1998 | Ayanoglu .................... 370/349 |
| 5,883,881 | A * | 3/1999 | Croslin ........................ 370/221 |
| 5,914,950 | A * | 6/1999 | Tiedemann et al. ......... 370/348 |
| 5,933,412 | A * | 8/1999 | Choudhury et al. ........ 370/218 |
| 5,933,422 | A * | 8/1999 | Kusano et al. .............. 370/331 |
| 6,128,280 | A * | 10/2000 | Jamoussi et al. ........... 370/230 |
| 6,167,025 | A * | 12/2000 | Hsing et al. ................. 370/216 |
| 6,272,107 | B1 * | 8/2001 | Rochberger et al. ........ 370/216 |
| 6,278,690 | B1 * | 8/2001 | Herrmann et al. .......... 370/224 |
| 6,292,463 | B1 * | 9/2001 | Burns et al. ................. 370/216 |
| 2001/0033548 | A1 * | 10/2001 | Saleh et al. ................. 370/218 |

OTHER PUBLICATIONS

ITU—T Recommendation Q.2959, Jul. 1996.
ITU—T Recommendation Q.2726.2, Jul. 1996.
The ATM Forum, Private Network—Network Interface Specification Version 1.0. doc. No. af-pnni-0055-000, Mar. 1996.

* cited by examiner

*Primary Examiner*—Kevin C. Harper
(74) *Attorney, Agent, or Firm*—Marks & Clerk

(57) ABSTRACT

There is provided a method and apparatus for the ordered release of connections from a network entity in a signalling communications network upon the detection of the failure of a signalling link or a port corresponding to such connections. A priority indicator is associated with each of the connections. Each priority indicator is selected from a priority hierarchy having several priority levels which varies from highest priority to lowest priority. Upon detection of the failure of a signalling link or port, every connection associated with the failed signalling link or port is released. The release of the connections takes place at the network entity in a sequence which corresponds to the priority hierarchy. A method and device are also provided for the ordered release of connections carried on a logical truck having a variable capacity, for example an IMA trunk, upon the detection of a reduction in capacity. The IMA trunk may be provided on several physical links. A priority indicator and traffic rate are associated with each of the connections carried on the IMA trunk. Upon detection of the reduction in bandwidth, a group of connections having an aggregate traffic rate corresponding to the reduced capacity of the IMA trunk is selected and the connections of the group are released in a sequence corresponding to the priority hierarchy.

33 Claims, 8 Drawing Sheets

Release List 174

| Signalling Links | 147s and 148sFail |
|---|---|
| Connection ID | Priority |
| II-II | HIGH |
| IV-IV | HIGH |
| III-III | MEDIUM |
| I-I | LOW |

| Connection ID | Signalling Link in | Signalling Link out | Port in | Port out | Priority | Band-Width |
|---|---|---|---|---|---|---|
| I-I | 145s | 148s | D | F | LOW | 5 |
| II-II | 146s | 147s | D | E | HIGH | 8 |
| III-III | 146s | 147s | D | E | MEDIUM | 10 |
| IV-IV | 146s | 148s | D | F | HIGH | 3 |

FIG. 4

Release List
Signalling Link 146s Fail 172

| Connection ID | Priority |
|---|---|
| II-II | HIGH |
| IV-IV | HIGH |
| III-III | MEDIUM |

FIG. 5

Release List
Signalling Links 147s and 148s Fail 174

| Connection ID | Priority |
|---|---|
| II-II | HIGH |
| IV-IV | HIGH |
| III-III | MEDIUM |
| I-I | LOW |

FIG. 6

Release List

NETWORK ENTITY INTERFACE 141 FAILS — 175

| Connection ID | Priority |
|---|---|
| II-II | HIGH |
| IV-IV | HIGH |
| III-III | MEDIUM |
| I-I | LOW |

FIG. 8

Release List — 176
Signalling Link 147s Fail

| Connection ID | Priority |
|---|---|
| II-II | HIGH |
| III-III | MEDIUM |

FIG. 7

Release List — 178
Signalling Links 148s Fail after 147's

| Connection ID | Priority |
|---|---|
| IV-IV | HIGH |
| III-III | MEDIUM |
| I-I | LOW |

FIG. 9

| Connection ID | Bandwidth (Mbits/s) | Priority |
|---|---|---|
| C1 | 0.3 | HIGH |
| C2 | 1.5 | HIGH |
| C3 | 0.2 | HIGH |
| C4 | 0.5 | HIGH |
| C5 | 0.5 | HIGH |
| C6 | 0.8 | MEDIUM |
| C7 | 0.5 | MEDIUM |
| C8 | 0.1 | MEDIUM |
| C9 | 0.1 | MEDIUM |
| C10 | 0.1 | MEDIUM |
| C11 | 0.1 | MEDIUM |
| C12 | 0.1 | MEDIUM |
| C13 | 0.2 | LOW |
| C14 | 0.3 | LOW |
| Total | 5.3 | |

FIG. 11

Release List

| Connection ID | Bandwidth (Mbits/s) | Priority |
|---|---|---|
| C8 | 0.1 | MEDIUM |
| C9 | 0.1 | MEDIUM |
| C10 | 0.1 | MEDIUM |
| C11 | 0.1 | MEDIUM |
| C12 | 0.1 | MEDIUM |
| C13 | 0.2 | LOW |
| C14 | 0.3 | LOW |
| Total | 1.0 | |

METHOD AND APPARATUS FOR PRIORITIZED RELEASE OF CONNECTIONS IN A COMMUNICATIONS NETWORK

FIELD OF THE INVENTION

The present invention relates generally to the field of communications networks which employ signalling protocols for establishing, maintaining and releasing switched connections. More particularly, the present invention relates to a method and apparatus for the release of switched connections in such networks based on a predetermined priority as assigned to each of the connections.

BACKGROUND OF THE INVENTION

In switched connection communications networks, an end-to-end connection or call is established and maintained by one or more on-demand bearer channels which together define a bearer channel path across the network being traversed. Examples of switched connection communications networks are the typical public switched telephone networks and virtual connection oriented digital networks in the form of Asynchronous Transfer Mode (ATM) or Frame Relay (FR) networks. In the ATM networking environment, an end-to-end call may take several forms. For instance, such calls may be provisioned by the use of a switched virtual connection (SVC) or a soft permanent virtual connection (S-PVC), described more fully below. Generally, these types of connections may be dynamically established and released substantially in real time by network elements such as data transmission switches, all in accordance with standard signalling protocols well known to those skilled in this art. An example of one such network element which allows for the dynamic initiation and release of calls is the model 36170 MainStreetXpress™ ATM multiservices network switch, which is commercially available from Newbridge Networks Corporation of Kanata, Ontario, Canada.

Network connections in the form of the previously mentioned SVC or S-PVC varieties are set up on demand, unlike a permanent virtual connection (PVC). The PVC is an end-to-end network connection that is defined at subscription time and is normally provisioned by a network management entity which typically operates over a management interface into the switches of the end-to-end path. Thus, PVC type connections are usually configured as relatively long hold time connections. With SVC type connections, on the other hand, these are set up on demand via a signalling protocol and tend to be associated with relatively short hold times compared to PVC type connections. An S-PVC is a signalled PVC which is set up on demand via a signalling protocol. Thus, an S-PVC is a kind of hybrid connection sharing some of the characteristics of each of a PVC and an SVC.

Ordinarily, signalling between network elements is carried over a signalling network comprising a call control and processing infrastructure which is associated with each network element, and further comprising an interface for communicating between counterpart network elements. The interface can consist of a separate overlay network, such as leased lines, as may be found in a Frame Relay SVC service. More typically, however, the interface consists of a PVC which has been dedicated for the transfer of signalling information or call control data between interconnected network elements. Such signalling virtual circuits can be carried over the same internode link facility as the bearer channels, or on separate dedicated links.

In order to initiate an end-to-end call, a calling device will typically transmit a call establishment request message to the network indicating a destination address for the call and the desired connection and quality of service parameters. For SVC type connections, the calling and called devices are typically customer premise equipment (CPE). For S-PVC type connections, the calling and called devices are typically ingress and egress network elements, as described in greater detail below. The call establishment request message is propagated through the network to a called device or destination address using one of two conventional routing techniques, namely hop-by-hop routing or source routing. In hop-by-hop routing, each network element which receives the call setup request message typically consults a routing table in order to determine the next hop or output bearer channel towards the intended destination. In source routing, on the other hand, the source or ingress network element maintains a database of the topology of the entire network and specifies the output ports that each network element should use to route the call.

Each network element which receives a call establishment request message generates a bearer channel cross-connect which links an input bearer channel to an output bearer channel. Ultimately, the call set up request message is relayed by the signalling network to the called device, and the called device is thus informed as to the identity of the bearer channel it should use for transmitting information in respect of the call. Once the call establishment request message is received at the destination device or destination address, a connection establishment message is sent back over the signalling network from the called device to the calling device in order to indicate that a connection has been established. At this point, the call is confirmed to have been established. The calling device, and the called device in the case of a bi-directional connection, may transmit user data through the network over the established bearer channel path. The signalling network may also be used to dynamically release a call and its associated bearer channel path in a manner similar to that used to establish the call, which was previously explained. When a call is to be released, the network entity initiating the release will typically transmit a call release message to the other device which is involved in the call. Call release may occur either by reason of a caller initiated termination or by reason of a network outage such as a signalling link failure or a port failure.

As well as being used for dynamically establishing and releasing a call, the signalling network is also used to transmit various types of status messages or link state messages relating to the operation of the call and its bearer channel path. These status or link state messages are associated with various sensing mechanisms employed by signalling standards for determining whether a given network entity or a link therefrom is alive and properly functioning. Such mechanisms typically include heartbeat processes relating to various layers of signalling protocol, as is described in greater detail below. A signalling link or port may fail for various reasons, including a software defect, an equipment failure in the call control infrastructure or a failure in the transmission link. When a failure is sensed as described above by other network elements adjacent to the failed portion of the signalling network, signalling standards will typically specify that all calls affected by the failure should be released.

When a signalling link or port fails, a signalling link layer which provides the functionality of order and flow control at each end of the failed link will detect that the link is no longer functioning. Pursuant to typical signalling protocols, this causes the signalling entities adjacent to the link failure to tear down or release all switched connections which utilize the failed signalling link or port. In both the upstream and downstream directions of a signalling link failure, all virtual connections which utilize the signalling link are typically released along the end-to-end path towards the end users. In the case of SVC type connections, these connections are cleared back to the source and destination of the calls, and end users must themselves proceed to re-establish the connections. In the case of typical S-PVC type connections, the signalled PVCs which are affected by the signalling link failure are automatically re-established after they are released in the manner described above to the calling party. Apart from signalling link and port failures, virtual connections may be released in a switched connection oriented network when a call is intentionally terminated by either the calling party or the called party, or due to an administrative action from a call processor or other management entity for the network environment.

Various differentiated levels of call service may be associated with connections over a switched network. In the prior art, the release of connections following a signalling link failure is typically carried out according to an arbitrary sequence. Thus, where connections with such differentiated levels of service share a given signalling link or port, it is possible for a connection that is associated with a superior level of service to be released later in sequence than a connection that is associated with an inferior level of service. It is also possible that the release of the connection having an inferior level of service will propagate to its source earlier when compared to the later released connection having the superior level of service. In either case, then, there is a likelihood that the connection with the lower level of service will be re-established over an alternate connection path prior to the connection with the higher level of service. If network resources are scarce or constrained, such a result could be unfavourable or unfair to the user of the connection with the higher level of service, especially if such user were charged a premium for call service that is expected by the user to deliver better performance.

The propagation delay associated with the transmission of a connection release message from a network node immediately adjacent to a network outage to a network node constituting a source or a destination for the connection will vary based upon the number of network nodes across which the connection must be released and the speed of the links connecting those nodes. All things being equal, it can typically be expected that multiple connections which are individually released from the same network node in a given sequence will have a general tendency to complete propagation to their respective source or destination nodes in more or less the same sequence. However, this will not always hold true for all network topologies.

Existing ITU-T specifications for communications networks describe the assignment of call priority to various connections in a network so as to allow for the preferential treatment of higher priority calls during call establishment. This is based on a priority level which has been preassigned to the call. These specifications detail the manner of handling a call in priority sequence during the call establishment phase of signalling, as outlined in the following publications: "Digital subscriber signalling system No. 2—Call priority", Series Q: Switching and Signalling, ITU-T Q.2959 dated July 1996 and "Broadband ISDN—B-ISDN application protocols for the network signalling. B-ISDN User Part—Call Priority", Series Q: Switching and Signalling, ITU-T Q.2726.2 dated July 1996.

It is a known technique in connection oriented networks to utilize inverse multiplexing in order to aggregate the capacity of a number of given physical links or trunks. For instance, in ATM networking, network trunks which are known to those in this art as IMA trunks are employed for this purpose. An IMA trunk is a logical trunk that is comprised of a plurality of smaller physical trunks. For instance, a number of T1 or E1 trunks may be multiplexed together to form a single logical cell stream of higher capacity, thereby allowing for data flows which may exceed the capacity of a given physical trunk. The use of multiple trunks also provides for redundancy of physical links such that if one trunk fails, connections may still be supported on the remaining trunks. The acronym "IMA" is used to describe inverse multiplexing over ATM networking environments.

With IMA logical trunks, a subset of the underlying physical trunks may fail, leaving the remaining underlying physical trunks of the logical trunk intact. This results in a reduced aggregate bandwidth for the overall logical trunk. Another situation may arise in which administrative actions, such as the removal of a physical link from a logical trunk, may reduce the aggregate available bandwidth of calls which are established over the logical trunk. When a reduction in available bandwidth occurs by reason of either of these causes or for other reasons, the calls utilizing the trunk may suffer a degradation in the quality of service unless the number of calls utilizing the logical trunk is reduced. This type of problem may occur in any communications technology where the physical layer or effective bandwidth can change over time or be reduced due to failures or physical impairments, for instance wireless or xDSL (Digital Subscriber Loop) technologies. In such situations in the prior art, calls which utilize the partially failed trunk are typically released in an arbitrary sequence. If a prioritized scheme for call release were to be implemented in the context of inverse multiplexing, this would permit the highest priority connections for a partially failed aggregated logical trunk to be retained for the remaining available bandwidth while releasing all other connections over the failed trunk in order of their priority sequence.

SUMMARY OF THE INVENTION

According to a first broad aspect, the invention provides a method for the ordered release of connections from a network entity in a signalling communications network. The connections are routed across the communications network along respective connection paths established therefor. The connection paths each traverse the network entity via network entity interfaces provided with the network entity through which the connections are routed. The method includes the steps of:

(a) associating a priority indicator with each of the connections, the priority indicator being selected from a priority hierarchy which has several of priority levels which vary from highest priority to lowest priority; and (b) upon detection of a network outage which is disruptive of communications over a number of connections, releasing every connection of the number of connections which the network outage has disrupted. The release takes place at the network entity in a sequence which corresponds to the priority hierarchy from the connection associated with the highest priority level to the connection associated with the lowest priority level.

According to a second broad aspect, the invention provides a method for the ordered release of a subset of connections of a number of connections provided on a single logical trunk linking a first network entity and a second network entity. The logical trunk has a variable capacity. The method includes the steps of:

(a) associating a priority indicator and a traffic rate with each of the connections, the priority indicator being selected from a priority hierarchy having several priority levels which vary from highest priority to lowest priority;

(b) upon detection of a reduction of the capacity of the logical trunk, selecting from the number of connections a group of connections to be released; and (c) following the selection of connections to be released, releasing every connection of the group of connections in a sequence which corresponds to the priority hierarchy from the highest priority level to the lowest priority level.

According to a third broad aspect, the invention provides an apparatus for the ordered release of connections in a signalling communications network. The connections are routed across a network entity in the communications network along respective connection paths therefor. The connection paths each traverse the network entity via network entity interfaces provided with the network entity and through which the connections are routed. The apparatus has:

(a) means for storing a priority indicator associated with each of the connections, the priority indicator being selected from a priority hierarchy which varies from highest priority to lowest priority;

(b) means for directing the release of every connection of a number of connections in the event that a network outage which is disruptive of communications over said number of connections is indicated to the apparatus. The release of the number of connections is directed in a sequence corresponding to the priority hierarchy from the connection associated in the storing means with the highest priority level to the connection associated in the storing means with the lowest priority level.

According to a fourth broad aspect, the invention provides an apparatus for the ordered release of connections carried on a logical trunk having a variable capacity. The logical trunk is provided in a connection-oriented communications network between a first network entity and a second network entity and carries a number of connections. The apparatus has:

(a) means for storing a priority indicator and a traffic rate with each of the connections of the number of connections, the priority indicator being selected from a priority hierarchy which varies from highest priority to lowest priority;

(b) means for selecting from the number of connections a group of connections to be released upon a reduction of the capacity of the logical trunk; and (c) means for directing the release of every connection of the group of connections in a sequence which corresponds to the priority hierarchy from the connection of the group associated with the highest priority level to the connection of the group associated with the lowest priority level.

BRIEF DESCRIPTION OF THE DRAWINGS

Preferred embodiments of the present invention will next be described for purposes of illustration and not of limitation, all by reference to the following drawings in which:

FIG. 4 is an example of a look-up table maintained for the switching network entity of FIG. 3;

FIGS. 5, 6 and 7 are examples of release lists compiled by the switching network entity of FIG. 3 according to the first preferred embodiment of the present invention upon the failure of one or more signalling links;

FIG. 8 is an example of a release list compiled by the switching network entity of FIG. 3 according to the first preferred embodiment of the present invention upon the failure of an access link;

FIG. 9 is a release list compiled by the switching network entity of FIG. 3 according to the first preferred embodiment of the present invention upon the consecutive failures of two signalling links;

FIG. 11 is a list of connections carried on the IMA trunk of FIG. 9;

DETAILED DESCRIPTION OF PREFERRED EMBODIMENTS

While it has been known to utilize an assigned priority level for a call in order to establish requested connections in a priority sequence during call establishment, it has not been known to prioritize the release of connections following a signalling failure, port failure or other network outage. By releasing connections from a failure point in a network in a sequenced order, for instance from higher priority connections down to lower priority connections, the probability that the release of the connections will be communicated to their respective source nodes in an approximately corresponding order is expected to increase. For instance, with connections which share the same end to end path, the higher priority connections released in this sequenced manner will be expected to have their released status communicated to their respective sources earlier than the lower priority connections released according to the same sequence. This will promote that an end system will take post-failure action on higher priority calls first. Such post-failure action may take the form of re-establishing the call, alerting applications or users, and initiating diagnostic activities, to name some examples. Where a series of virtual connections share the same end-to-end path, and those connections are associated with different levels of assigned priority, the prioritized release of calls upon a network outage may allow for earlier end system awareness of terminated connections. If this takes place, an advantage that could be gained would be that of promoting higher priority calls to be re-established earlier than lower priority calls and to therefore to have such higher priority calls make use of the available remaining bandwidth before such lower priority calls.

Figure 1:
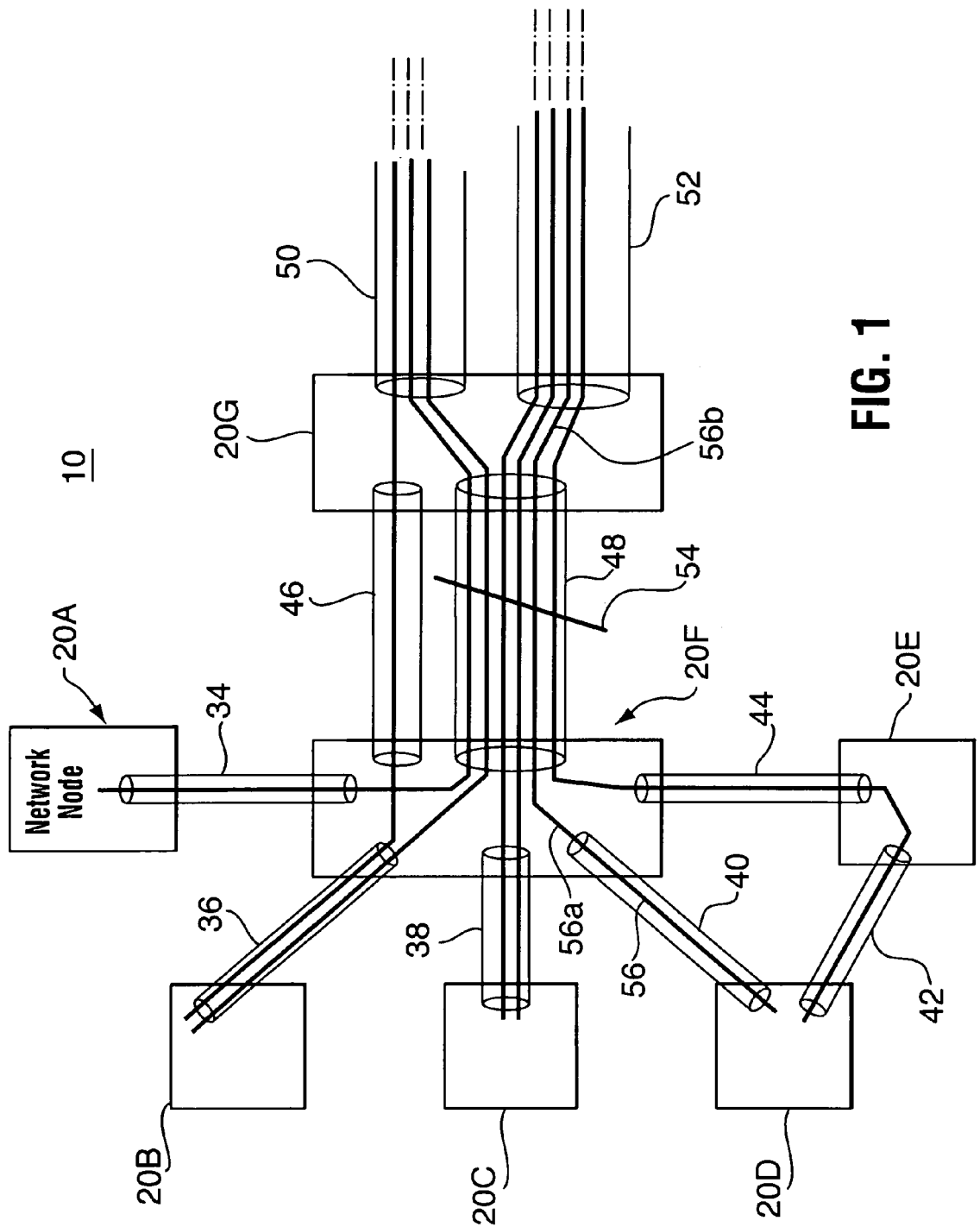
FIG. 1 is a signalling networking environment according to the prior art having switching network entities through which connection paths are routed.

With reference to FIG. 1, an example of a signalling communications network according to the prior art is demonstrated by the networking environment 10. The networking environment 10 may be an ATM network which comprises a plurality of network nodes 20A to 20G. A subscriber node in the form of customer premise equipment (CPE) is identified as network node 20A. The subscriber CPE 20A is connected by means of a User-to-Network (UNI) compliant interface 34 to the network node 20F. The various interfaces at node 20F may be UNI compliant (for instance the interface 34). As well, these interfaces may be Network-to-Network or Network-Node (NNI) interfaces (for instance the interfaces linking to nodes 20B, 20C, 20D, 20E and 20G). In the particular example of FIG. 1, the network node 20F handles both SVC type connections, and S-PVC type connections. The UNI compliant interface 34 from CPE 20A carries subscriber SVC type connections, and S-PVC type connections may be originated on behalf of the subscriber CPE 20A at the network side of the UNI interface 34. The NNI compliant interfaces 36, 38, 40, 42, 44, 46, 48, 50 and 52 may be used to support both signalled SVC and S-PVC connection types. Both UNI compliant interfaces and NNI compliant interfaces, and their respective protocols and specifications, are well known to those in this art.

Network node 20F is connected to network node 20G by means of two NNI compliant interfaces 46 and 48. Thus, when one of these NNI compliant interfaces experiences a failure, the other interface may still be available for the re-routing of connections which rely on the failed interface for signalling purposes. In the exemplary networking environment 10, a signalling link failure is represented by the intersecting line 54. A signalling link failure is one example of a network outage, but network outages may also result from other causes as well, for instance from port failures, network node failures or administrative outages. In the example of signalling link failure 54, all connections of the failed NNI interface 48 will be released according to known signalling protocols, for instance the ATM Forum Private Network—Network Interface (PNNI) Specification, af-pnni-00 55.000, dated March 1996, well known to those skilled in this art.

As mentioned previously, a release of connections according to the prior art following a network outage will not take place according to any preselected order or priority scheme. Rather, the connections over the failed interface 48 will be released in an arbitrary sequence. For instance, in the case of connection 56 whose source node is network node 20D, the failed state of the interface 48 will be detected by each of the network nodes 20F and 20G which are adjacent the signalling link failure 54. Each of these network nodes will in turn signal respective call release messages in the preceding and succeeding directions from the signalling link failure. In the preceding direction (i.e. the direction from the called party to the calling party), the call release message from network node 20F will propagate to the source node of the connection, namely network node 20D. In the succeeding direction (i.e. the direction from the calling party to the called party), the call release message from network node 20G will propagate to the destination node of the connection (not shown). Typically, every network node along either of the preceding and succeeding signalling paths through which a call release message propagates will release its respective cross-connects, as mandated by known signalling protocols. As well, the cross-connects in each of the nodes which originate the call release messages, namely the cross-connects 56a in node 20F and 56b in node 20G, will typically be released upon the generation of the call release messages in each of the preceding and succeeding directions.

When the call release message in the preceding direction arrives at the source node for connection 56, this node will automatically attempt to re-establish the connection if the released connection is of an S-PVC type and will do so upon subscriber request in the case of an SVC type of connection. Another example is resilient SVC service, where the network will automatically re-establish an SVC on behalf of a subscriber, and will only notify the subscriber of the call failure if the call cannot automatically be re-established. In whatever manner the connection is re-established, an alternate routing path may be chosen to avoid the signalling link failure 54. For instance, the new connection path for released connection 56 may be routed from network node 20D to network node 20F over NNI interface 40, and then from network node 20F to network node 20G over NNI interface 46. Alternatively, the new path may be routed from network node 20D to network node 20G via network nodes 20E and 20F utilizing the NNI interfaces 42, 44 and 46.

From the foregoing example, it can be appreciated that where any given source node in the network environment 10 is associated with an appreciable number of released connections following a given network outage, a large number of call establishment requests may have to be processed by the node in order to re-establish the connections. In some network devices, resource constraints may limit the number of connections which can be handled while in a setup state. Typically an overload condition and service degradation can occur if there are more connections requesting re-establishment than there are resources available.

Generally, connection establishment requests will be generated by the source nodes in the order in which the corresponding connection release messages were received by the nodes following a network outage. This order will not always correspond to the order in which connections were released due to the effects of network propagation delay. This propagation delay is associated with the transmission of a connection release message, which is sent from a network node immediately adjacent a network outage and is delivered to a terminal node, such as the source or destination of the connection. The propagation delay associated with the release of a connection depends on the particular routing of the connection and the load pertaining to each node along that route. Typically, it can be expected that the release and reestablishment of a connection which is routed through many nodes is likely to be less timely than for a connection which is routed through fewer nodes. All things being equal, however, the order in which two connections will be released and re-established will generally be the same as the order in which those connections were released from the point in the network where the network outage was first detected.

The present invention is particularly advantageous where the system resources, whether hardware or software, are becoming scarce and call service threatens to degrade as a result. In the event that lower priority calls are re-established first before higher priority calls, pre-emption can be employed to allow the higher priority calls to succeed. However, the present invention may assist in reducing the likelihood that pre-emption will be resorted to in a given situation.

Figure 2:
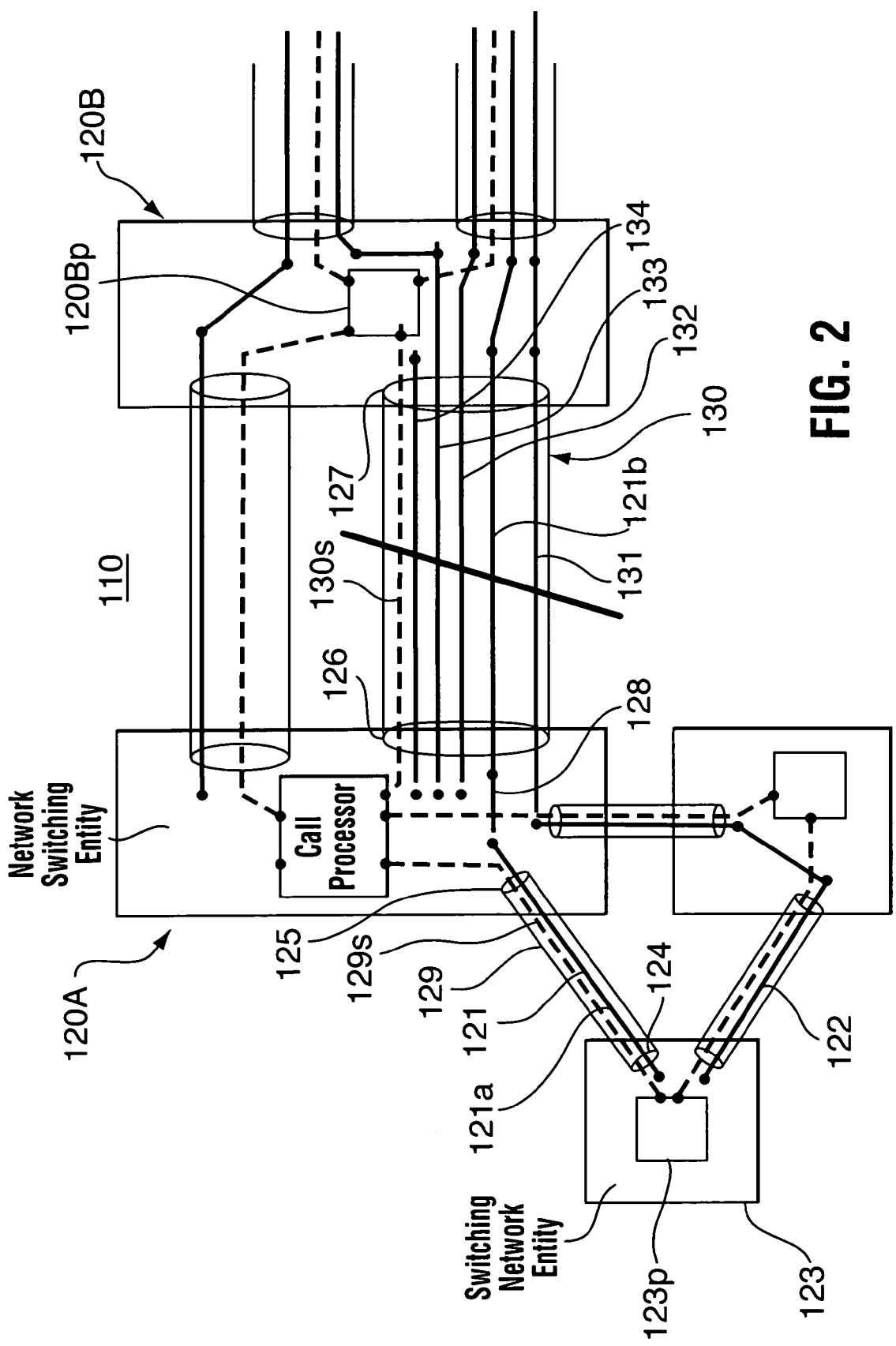
FIG. 2 is an example of an ATM network illustrating the functioning of the present invention in the event of a network outage.

Referring now to FIG. 2, the method according to a preferred embodiment of the present invention may be implemented in each network switching entity 120A, 120B along the respective connection paths 121, 122 over which connections or calls are routed across a signalling communications network 110. Preferably, the communications network 110 is an ATM networking environment but those skilled in this art will appreciate that the present invention may be implemented according to various other networking protocols, for instance those associated with Frame Relay networks or with any other connection oriented networks. The switching network entities 120A, 120B are preferably ATM network switches, for instance the MainStreetXpress™ 36170 multiservices network switch available from Newbridge Networks Corporation of Kanata, Ontario, Canada. Other switching network entities may be employed or adapted for use with the present invention, as those versed in this art will appreciate.

The connections being routed along the respective connection paths 121, 122 are preferably switched connections, for instance SVC or S-PVC type connections in an ATM networking environment. In the case of the connection or call routed along the connection path 121, this connection path is routed beginning with the first leg 121a thereof which connects the source network entity 123 to the intermediate switching network entity 120A. The first leg 121a of connection path 121 is established over physical link 129 between a first network entity interface such as port 124 of the source network entity 123, and a second network entity interface such as port 125 of the intermediate network entity 120A. The second leg 121b of the connection path 121 connects the intermediate switching network entity 120A to the intermediate switching network entity 120B. The second leg 121b is established over physical link 130 between the respective network entity interfaces 126, 127, wherein network entity interface 126 may be a port of the switching network entity 120A and network entity interface 127 may be a port of the switching network entity 120B.

The first and second legs 121a, 121b traverse the switching network entity 120A by means of cross-connect 128. Each of the ports 125 and 126 are respectively associated with signalling links 129s and 130s (shown in dashed lines), which are carried over physical links 129 and 130. Each signalling link terminates at a call processor associated with each switching network entity, as is known to those skilled in this art. For instance, signalling link 129s terminates at call processor 123p of switching network entity 123 and at call processor 120Ap of switching network entity 120A. Likewise, signalling link 130s terminates at call processor 120Ap of switching network entity 120A and at call processor 120Bp of switching network entity 120B. As previously explained, the signalling links are for communicating status information concerning the operation of the connections routed through the access links. For example, connections routed along the connection paths 131 to 134 together with connection path 121, correspond to the same port 126 and port 127 (physical link 130) and make use of the common signalling link 130s for network signalling purposes, namely for those activities concerning the establishment, maintenance and release of connections routed through physical link 130. The signalling links 129s, 130s may be UNI compliant, NNI compliant or PNNI compliant, to name some examples of recognized signalling protocols well known to those skilled in this art and suitable for adoption with the present invention. Other suitable signalling protocols will be apparent to persons versed in the art of communications networks. In this example, only one signalling link is associated with each physical link or port. It will be appreciated, however, that more than one signalling link may be associated with each physical link. Those skilled in this art will appreciate that multiple signalling links may be desirable to increase call establishment rates or for partitioning many logical links onto a physical link. Alternatively, a signalling link may be provided on a physical link separate from the physical link carrying the connections with which the signalling link is associated.

A priority indicator is associated with each of the connections which are routed across the communications network 110 along the various connection paths 121, 122 and 131 to 134. The priority indicator is selected from a priority hierarchy comprised of a plurality of priority levels which vary from highest priority to lowest priority. When a network outage is detected which is disruptive of communications over connections traversing a switching network entity such as the signalling link failure represented by the diagonal line 136, the connections which correspond to the failed signalling link will be released according to a priority sequence. In the example represented by FIG. 2, the connections routed along the connection paths 121, 122 and 131 to 134 will be affected by the signalling link failure at 136. Connections routed along the connection paths 121, 122 and 131 to 134 will be released in a sequence corresponding to the priority hierarchy from the connection associated with the highest priority level to the connection associated with the lowest priority level. That is, the connections will be released in order from highest to lowest priority. A similar release procedure may be followed in the event of the failure of a physical link, logical link, port or other equipment associated with any network entity which interrupts service. Upon occurrence of such a failure, all connections carried on the failed link, port or other equipment will be released according to priority sequence.

Preferably, the priority indicator for each connection is communicated to each network switching entity 120A, 120B along the connection path 121 for the connection. For instance, this may be achieved by means of transporting the priority indicator within a connection establishment request message at the time the source network entity 123 requests the connection path to be provisioned. When the connection establishment request message propagates along the connection path 121 for the intended connection to each of the switching network entities 120A, 120B therealong, each such switching network entity will read or otherwise recognize the priority indicator and will store same for subsequent retrieval in the event of a network outage affecting the connection.

By way of example, in the case of a Call SETUP message according to the PNNI protocol, the priority indicator mentioned above may be placed within an Information Element (IE) of this message that may be specifically created for this purpose. Alternatively, use may be had of existing call priority indicators, for instance those which may be available in the standardized call establishment messages according to other known protocols. Examples of such protocols were provided above in relation to ITU-T specifications Q.2959 and Q.2726.2. When the existing call priority indicator is adopted for purposes of the preferred embodiment of this invention, the value of the call priority indicator for purposes of known call establishment priority is shared for purposes of call release priority, as explained below.

When each of the switching network entities along a connection path receives a connection establishment message for a given connection which contains a connection release priority indicator, each such entity will preferably store the priority indicator in a memory such that the priority indicator is mapped to the given connection. Where the memory is onboard the switching network entity, the memory may take the form of a look-up table or the like.

Those skilled in this art will appreciate that the memory may instead be located remotely of a switching network entity, if desired.

Figure 3:
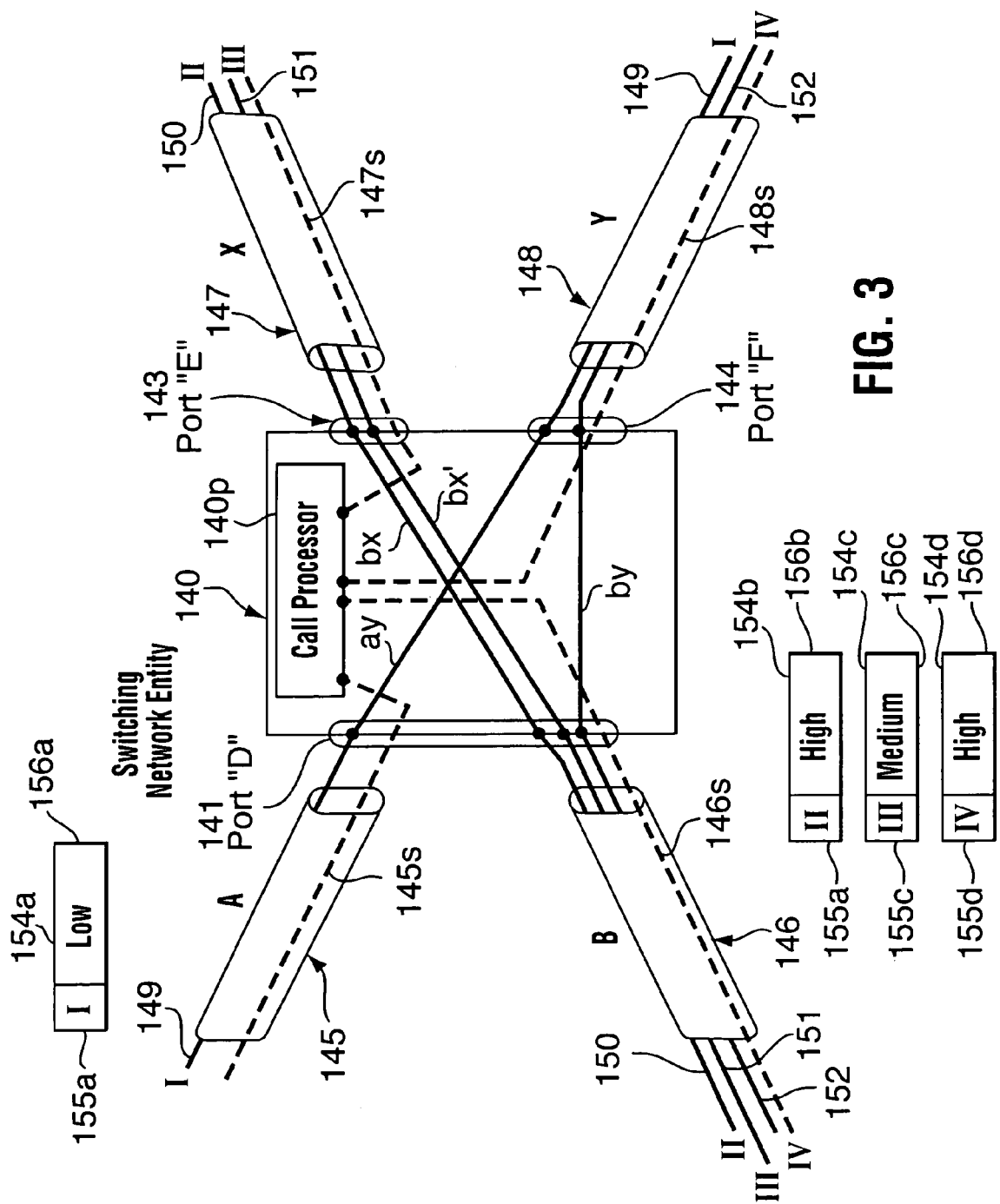
FIG. 3 is an example of a switching network entity employing a connection release method according to a first preferred embodiment of the present invention.

Turning now to FIG. 3, a more detailed description of the functioning of the present invention will next be addressed with reference to the switching network entity 140. The switching network entity 140 provides network entity interfaces 141, 143, and 144 in the form of ports labelled D, E, F respectively. Those skilled in this art will appreciate that greater or fewer network entity interfaces may be provided by the switching network entity 140 and that each network entity interface may serve as both an ingress port and an egress port for connections traversing the switching network entity 140. Network entity interface 141 (Port "D") carries two logical links 145 and 146, which are labelled A and B in FIG. 3. In the ATM networking environment, an example of a logical link is a virtual path trunk. Network entity interface 143 (Port "E") carries physical link 147, labelled X. Network entity interface 144 (Port "F") carries physical link 148, labelled Y. In the preferred embodiment, each of the physical or logical links 145 to 148 is provided with corresponding signalling links 145s to 148s between the switching network entity 140 and another network entity (not shown). Each signalling link is used to set up, tear down and maintain calls between the switching network entity 140 and such other network entity. The signalling links 145s to 148s terminate at call processor 140p which, in this particular example, is provided in switching network entity 140. Those skilled in the art will appreciate that more than one signalling link may be associated with a single physical link. It will be further appreciated that more than one signalling link may be provided between the same two network entities. The network entity interfaces 141, 143 and 144 (Ports "D", "E" and "F") each correspond to a number of connections that are routed over the connection paths 149, 150, 151, 152 established therefor.

Thus, connection I—I is routed along connection path 149, which traverses the switching network entity 140 via network entity interface 141 (Port "D"), cross-connect ay and network entity interface 144 (Port "F"). Connection II—II is routed along connection path 150, which traverses switching network entity 140 via network entity interface 141 (Port "D"), cross-connect bx and network entity interface 143 (Port "E"). As for connection III—III, this connection is routed along connection path 151. This connection path also traverses the switching network entity through network entity interfaces 141 and 143 (Ports "D" and "E", respectively), through cross-connect bx'. Lastly, connection IV—IV is routed along connection path 152, which traverses network entity interfaces 142 and 144 (Ports "D" and "F", respectively). These network entity interfaces are connected by cross-connect by to establish connection path 152 through the switching network entity 140.

When each of the connections I—I, II—II, III—III and IV—IV through the switching network entity 140 is established, the respective connection establishment request messages 154a to 154d therefor will transport a corresponding connection identifier 155a to 155d and a corresponding release priority indicator 156a to 156d selected from a priority hierarchy. As mentioned previously, the release priority indicators may be the call priority indicators used for determining call establishment priority.

In the example of FIG. 3, three priority levels are utilized in the priority hierarchy. Namely, these are identified as LOW, MEDIUM and HIGH in order of increasing priority. More or fewer priority levels may be provided. Connection I—I has a release priority level of LOW. Connection III—III has a release priority level of MEDIUM. Connection II—II and connection IV—IV each have a common release priority level of HIGH. The switching network entity 140 reads the priority indicators 156a and 156d and the connection identifiers 155a and 155d in the connection establishment request messages and stores the information in a look-up table. An identification of the signalling links and network entity interfaces (e.g. ports in this preferred embodiment) corresponding to each connection is also stored in the look-up table. Such tables may preferably be mapped within an on-board memory in the switching network entity 140 for subsequent access in the event of a network outage, as explained below.

Referring now to FIG. 4, an example of a look-up table 170 which may be maintained in the memory of the switching network entity 140 is shown. The look-up table 170 stores information about each connection carried by the switching network entity 140. The information includes the signalling links and network entity interfaces (e.g. ports) associated with each connection, the release priority level of the connection and a traffic rate of the connection, which is technology-dependent. For instance, the traffic rate could be expressed in units of kbits/s or Mbits/s for ATM, which represents the computed virtual bandwidth based on connection parameters such as peak cell rate, sustained cell rate, mean burst size and the like. For Frame Relay, the measurement of connection bandwidth could be computed based on parameters such as committed information rate, committed burst size, excess burst size and the like. Each connection is identified in the look-up table 170 by its connection identifier 155a to 155d. It will be appreciated by those skilled in the art that other information about each connection may also be stored in the look-up table 170. The inclusion in the look-up table 170 of a measure of bandwidth or any other measure of the traffic rate for each connection is not essential for the proper operation of the preferred embodiment of the invention, but may be useful to perform a secondary level of ordering for the release of connections, as described more fully below.

When the switching network entity 140 detects a failure of a signalling link, it begins sending release messages to the sources or destinations of the connections that had been using the failed signalling link. A similar procedure is followed when the failure of a network entity interface is detected. The release messages are sent over the existing signalling links which connect the switching network entity with the source or destination according to a known signalling protocol such as PNNI 1.0. If the network outage is a downstream signalling link, then the switching network entity 140 will send release messages to the sources of the connections that had used the failed signalling link. If the failed signalling link is upstream from the switching network entity 140, then the switching network entity 140 sends release messages to the destinations of the connections that had used the failed signalling link. For example, if signalling link 147s failed, the switching network entity 140 would send connection release messages to the source of connection 150 (labelled "II—II") and connection 151 (labelled "III—III") over signalling link 146s. On the other hand, if signalling link 146s failed, the switching network entity 140 would send connection release messages to the destinations of connection 150 (labelled "II—II") and connection 151 (labelled "III—III") over signalling link 147s, and to the destination of connection 152 (labelled "IV—IV") over signalling link 148s.

In the prior art, the release of connections associated with a failed signalling link or port was not performed in a prioritized order, but rather was typically performed in an arbitrary sequence. According to the preferred embodiment of this invention, the connections affected by a network outage are released in a priority sequence from the connection associated with the highest priority level to the connection associated with the lowest priority level. When a signalling link fails, the switching network entity 140 establishes a prioritized release list in memory which includes a list of those connections associated with the failed signalling link. The release list is compiled by searching the look-up table 170 for connections which are associated with the failed signalling link. The release list includes the connection identifiers of the connections to be released and the corresponding connection priority level. The release list is prioritized by using an insertion sort method in which each connection associated with the failed signalling link is inserted into the release list at a location corresponding to the release priority of the connection. It will be appreciated that other methods for sorting the release list in a prioritized order may be used. A release list is compiled according to the same procedure when a port or other network entity interface fails instead of a signalling link.

Referring to FIG. 5, in the event that signalling link 146$s$ fails, a release list 172 is compiled containing the connection identifiers and release priority indicators for the connections associated with signalling link 146$s$. Connections II—II, III—III and IV—IV are each inserted into the release list 172 in the order of their release priority. Since connection II—II and connection IV—IV have higher release priority levels than connection III—III, they are inserted into the release list 172 ahead of connection III—III. Because connection II—II and connection IV—IV have a common level of release priority, the order in which they are inserted into the release list 172 relative to each other may be random. Alternatively, a preselected secondary level of ordering may be performed for connections associated with a common level of priority.

An example of a secondary level of ordering based on a measure of the traffic rate of the connections will now be described. In the event that two or more connections to be released have a common release priority level, the bandwidth associated with the connections may optionally be used to provide a second level of connection release ordering. In such a case, the connection having the higher bandwidth may be inserted in the release list ahead of other connections of the same release priority that have lower bandwidth. The reason for placing connections associated with higher bandwidth higher up on the release list is that establishing a connection is generally more difficult where the connection carries a high volume of traffic requiring a significant amount of channel capacity. On the other hand, adding an additional connection is generally easier where the required channel capacity is small or incrementally less significant. When a signalling link or network entity interface fails, a high volume connection has a greater likelihood of being reestablished if it is released sooner, before large blocks of channel capacity are fragmented into many smaller slices by the reestablishment of many lower volume connections. The low volume connections will not be as significantly prejudiced by a later release as a high volume connection because sources of additional small slices of channel capacity generally are more common than large blocks of available bandwidth. It will be appreciated that criteria other than connection bandwidth may be used to perform a secondary sort of connections having the same priority.

When more than one signalling link fails, a single release list is compiled containing all of the connections corresponding to those signalling links which have failed. FIG. 6 shows a release list 174 that is compiled if signalling links 147$s$ and 148$s$ both fail. The connections are listed in the release list 174 from highest to lowest priority. Where a network entity interface fails, a release list is compiled containing all of the connections carried on the failed network entity interface. For example, if network entity interface 141 (labelled "D") failed, release list 175 of FIG. 8 would be compiled with the connections listed in priority sequence.

Where a signalling link only controls connections on one network entity interface, for instance a single port, then the release list compiled upon the failure of the port will be the same as that which would be applied upon the failure of all of the signalling links on the port. In such a case it may not be necessary to detect port failures as the same result may be achieved by detecting the individual signalling link failure. However, where a single signalling link controls connections provided on a number of ports it is unnecessary to release all connections controlled by the signalling link on the failure of one of the number of ports as long as the port carrying the signalling link remains functional. In such a case, only the connections carried on the failed port need to be released. Thus, to manage the priority release of the minimum number of connections in such a case, the failure of the port must be detectable and each connection must be associated in the look up table with the port on which it is carried.

Once the switching network entity 140 has compiled a release list, it begins sending connection release messages to sources or destinations of the connections in the release list. Using release list 174, the switching network entity 140 would first send a connection release message to the source of connection II—II, and then proceed to release the next connection in the release list 174. Once a connection has been released, it may be deleted from the release list 174. Alternatively, a released connection may be marked as released. The switching network entity 140 continues to release connections until the release list 174 is empty or all connections listed in the release list 174 are marked as released.

When a second network outage occurs after a release list has already been compiled because of the failure of a first network outage, the release list may be updated by inserting the additional connections affected by the second network outage. For example, if signalling link 147$s$ failed first, a release list 176 as shown in FIG. 7 would be compiled. If, after connection II—II has been released and deleted from the release list 176, signalling link 148$s$ fails, the release list 176 is updated as shown in updated release list 178 of FIG. 9. Because connection II—II has already been released it is not included in the updated release list 178.

By compiling the release list according to the methods disclosed above, connections of higher release priority will tend to be reestablished before connections of lower priority. In some instances, the delay involved in reestablishing a high priority call may be reduced. This is due to the fact that network elements such as switching network entity 140 are limited in the rate at which they can send connection release messages. Where a signalling link which is associated with a large number of connections fails, the network element adjacent to the signalling link may require a significant amount of time to release all of the connections associated with the failed signalling link. By releasing higher priority connections first, the delay between the signalling link failure and the release of such connections will generally be reduced. In addition, the connection release message for a higher priority connection will tend to arrive at the source of the connection before the connection release message for a lower priority connection using the same source. Assuming that the source attempts to reestablish connections in the order in which they have been released, a connection reestablishment request message for the higher priority connection will thus be processed before connection reestablishment requests for lower priority connections. Thus, remaining network resources will tend to be allocated to the reestablishment of the higher priority connections before they are allocated to the reestablishment of lower priority connections.

The general tendency for higher priority connections to be reestablished before lower priority connections will be subject to the propagation delays involved in the transmission of the release messages to the respective sources. Propagation delays may also be a factor in the transmission of connection reestablishment request messages. Both release and reestablishment messages may have to be queued at intermediate network entities before arriving at a source or destination, thus adding to the propagation delay.

The method of the preferred embodiment of the invention may be applied with some variation to the release of connections provided on an IMA trunk when a subset of the underlying physical trunks which comprise the IMA trunk fails. In such a situation, it is not necessary for all connections on the IMA trunk to be released since the effect of the failure of the subset of trunks is simply a reduction in the traffic carrying capacity of the IMA trunk. However, it may be necessary to release some of the connections in order to reduce the aggregate minimum bit rate guaranteed of the connections on the IMA trunk to a level that may be accommodated by the reduced capacity of the IMA trunk.

Figure 10:
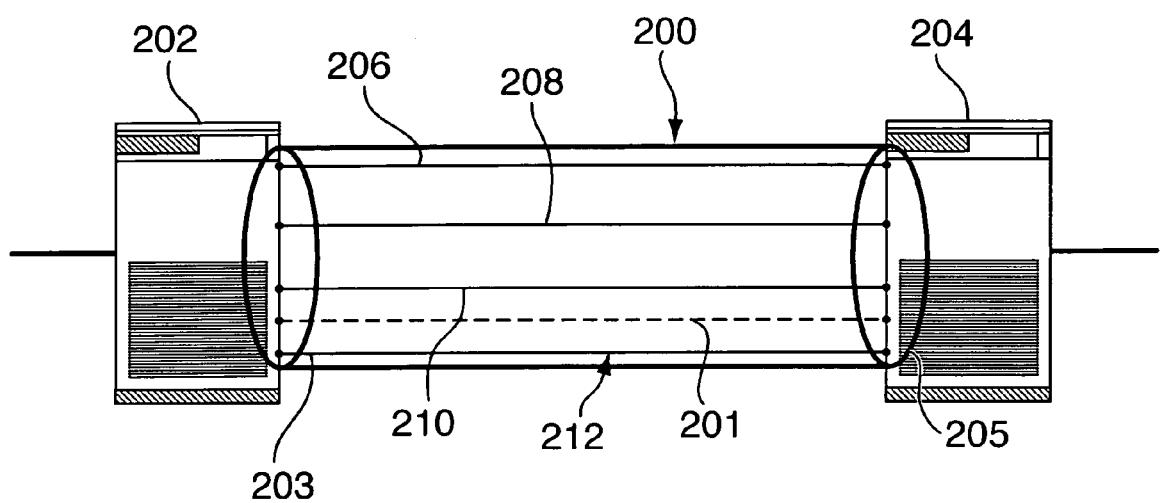
FIG. 10 is an IMA trunk in an ATM networking environment according to a second preferred embodiment of the present invention.

Referring to FIG. 10, an IMA trunk 200 may be provided between a first network entity 202 and a second network entity 204. Since the IMA trunk is bi-directional in this particular example, each of the network entities 202, 204 multiplex and de-multiplex the constituent traffic flows of the trunk. The IMA trunk 200 is provided in this example by way of four 1.5 Mbit/s T1 links 206, 208, 210, 212. The IMA trunk is connected to each of the first and second network entities by way of logical network entity interfaces 203 and 205, respectively. The traffic carrying capacity of the IMA trunk 200 is therefore 5.8 Mbit/s with 0.2 Mbit/s required for a signalling link 201 and the administration of the multiplexing of the traffic on the IMA trunk 200. By way of example, a list of the fourteen connections carried over the IMA trunk 200 is shown in FIG. 11. Each connection is identified by a connection identifier C1 to C14 and has a corresponding bandwidth and priority indicator. The sum of the bandwidths for connections C1 to C14 is 5.3 Mbits/s, meaning that the IMA trunk 200 is operating at 0.5 Mbits/s less than full capacity. A single signalling link 201 is provided over the IMA trunk 200, though it is possible to have more than one signalling link. The information in the list in FIG. 11 may be stored as a look-up table in one of the first network entity 202 and the second network entity 204 or, if desired, in each of them. As explained previously, the connections list may alternatively be stored remotely of the network entities 202, 204. The connections listed in FIG. 11 are listed in their priority sequence for ease of reference only. It will be appreciated that the connections may be listed in a look up table in a non-prioritized order.

If the signalling link provided on the IMA trunk 200 failed, all of the connections associated with the failed signalling link would have to be released. Similarly, upon the failure of an entire logical network entity interface 203 or 205, all of the connections carried on the IMA trunk 200 would have to be released. The release of connections in these cases could be carried out according to the methods of the invention described above. However, where only a subset of the physical trunks of the IMA trunk 200 fails, it is not necessary to release all connections, but rather only a subset. According to this preferred embodiment, the release of connections involves two steps: first, the subset of connections to be released is identified; second, the order of the release of the identified connections is determined.

If T1 link 206 fails, the capacity of the IMA trunk 200 is reduced to 4.3 Mbits/s. The IMA trunk 200 would no longer be able to guarantee the 5.3 Mbits/s aggregate bandwidth of connections C1 to C14. Thus, the aggregate bandwidth of the connections carried over the IMA trunk 200 must be reduced by 1 Mbits/s from 5.3 Mbits/s to 4.3 Mbits/s. The aggregate bandwidth is preferably reduced by releasing the lowest priority connections before releasing the higher priority connections. Therefore, lowest priority connections C13 and C14 should be released. However, the release of connections C13 and C14 would only reduce the aggregate bandwidth by 0.5 Mbits/s. Thus, some of the connections having a medium priority level must also be released. The released medium priority level connections must have an aggregate bandwidth of at least 0.5 Mbits/s in order to bring the total aggregate bandwidth to 4.3 Mbits/s or less.

It will be appreciated that not all of the connections of medium priority need to be released in order to reduce the aggregate bandwidth to the desired level. Furthermore, the reduced aggregate bandwidth may be achieved by releasing either only connection C7, or connections C8 to C12. Releasing connection C7 would require the release of fewer connections to reach 4.3 Mbits/s total aggregate MCR. This may be desirable because fewer connections would need to be reestablished. On the other hand, lower volume connections such as connections C8 to C12 may be easier to reestablish through alternate paths than a single 0.5 Mbits/s connection like connection C7. Those skilled in the art of communications networks will appreciate the relative merits of selecting more or fewer connections for release. An alternate possible method for determining which connections of a common priority level should be released could be based on the service category of the calls. For example, it may be desirable to release Unspecified Bit Rate (UBR) connections before releasing Available Bit Rate (ABR) connections.

Once the connections to be released have been identified, a release list is compiled and the order of release is determined. Although the selection of the connections to be release started with the lowest priority connections, the release of the selected connections is performed from highest to lowest priority. The rationale for this prioritized release is the same for an IMA trunk as it is for the failure of a signalling link. As explained previously for the case of a signalling link failure, once it is determined that a connection of a particular priority within an IMA trunk is to be released, that connection should be released before other connections of lower priority.

Figures 12, 13:
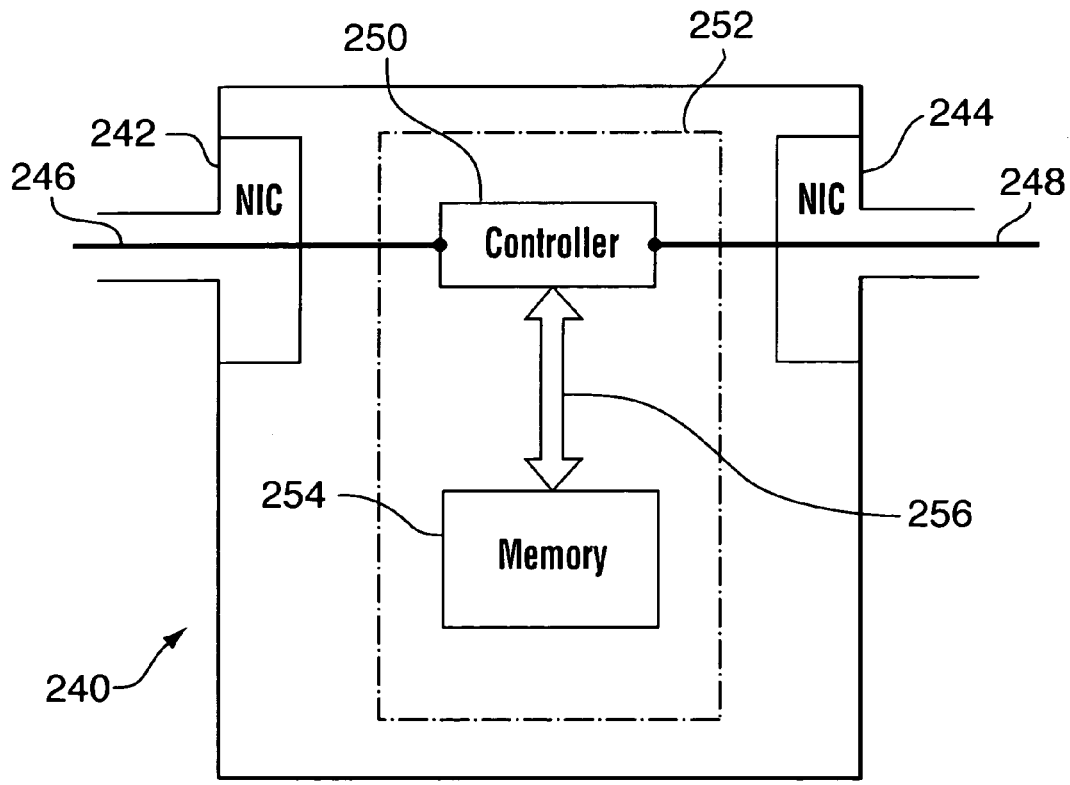
FIG. 12 is a release list compiled according to a preferred embodiment of the present invention following a reduction in bandwidth of the IMA trunk of FIG. 9.
FIG. 13 is a network element according to a third preferred embodiment of the present invention which may be used to employ the connection release method according to the present invention.

Assuming that it has been determined that it is preferable to release more low volume connections than fewer high volume connections, a prioritized release list 216 may be compiled as shown in FIG. 12. The connections listed in the release list 216 may be released by either the first network entity 202 or the second network entity 204 according to the method described above. Unless it is predetermined as to which network entity 202, 204 will release the connection, it may be possible for each network entity 202, 204 to select a different group of connections for release, resulting in the release of an excessive number of connections. In order to avoid this, one of the first network entity 202 and the second network entity 204 may act as a slave and the other may act as a master in respect of the administration of the connections on the IMA trunk 200. In the preferred embodiment, the master determines which connections are to be released and compiles the release list 216.

The description of the method of the invention by reference to an IMA trunk is by way of example only. The application of the method of the invention to the ordered release of connections following a reduction in the traffic carrying capacity of a logical trunk is not limited in application to an IMA trunk but may be applied to any logical trunk which may suffer a reduction in traffic carrying capacity, such as wireless or xDSL ("x" since there are many related DSL technologies, such as ADSL, SDSL, VDSL and the like).

The details of a network element 240 according to a preferred embodiment of the invention may be appreciated from FIG. 13. The network element is preferably a model 36170 MainStreet Xpress™ ATM multiservices network switch ("36170 switch") adapted to provide the functionality of the present invention. The network element 240 has a first network interface card (NIC) 242 which provides a first network element interface or port to the network element 240 and a second NIC card 244 which provides a second network element interface or port. The network element 240 may have additional NICs and each NIC may have more than one port. Each of the ports on the NICs 242, 244 connects the network element 240 to another network entity.

Signalling links 246, 248 are provided at each of the NICs 242, 244. The signalling links are used to set up, tear down and maintain calls carried on their respective NICs 242, 244. As illustrated in FIG. 13, all signalling messages received by NIC 242 are routed to a call processing and signalling controller 250. Likewise all signalling messages received by NIC 242 are also routed to the controller 250. The controller 250 executes the Connection Admission Control (CAC) and signalling functions for connections associated with signalling links 246, 248. For example, the controller 250 receives signalling messages such as call establishment request and release messages over the signalling links 246, 248. The controller 250 also initiates connection release messages for connections carried by the network entity 240. The controller 250 is preferably provided on a function card 252 which fits into one of many universal card slots available in the peripheral shelf of the 36170 switch. Alternatively, the functions of the controller 250 may be provided through a set of distributed cards which together provide the functionality required to execute the methods of the invention. The controller 250 may be specifically designed to execute the methods of the invention in hardware or may be a programmable device which is provided with the necessary functionality through software. The controller 250 may perform other functions in the network element 240 in addition to those described herein.

In addition to the signalling links 246, 248, the NICs 242, 244 may route ATM cell traffic received by the network element 240 through a switching fabric (not shown) provided in the network element 240. The network element 240 may carry one or many connections which traverse the network element 240 via the NICs 242, 244. It will be appreciated that each NIC 242, 244 may support many communication channels for carrying the connections. For simplicity, the function of the network element 240 will be described by reference only to the signalling infrastructure of the network element 240 and the connections and switching fabric are therefore not shown in FIG. 13.

Each connection traversing the network element 240 is established by a connection establishment request message received by the controller 250 over one of the signalling links 246, 248 via the corresponding NIC 242 or 244. Each connection establishment request message includes information identifying the requested connection and an indication of the level of priority of the connection. The connection establishment request message may include other information necessary for the establishment of the connection as will be appreciated by those skilled in this art.

The network element 240 also has a memory 254. The memory is preferably provided on the same function card 252 as the controller 250 and is preferably connected to the controller 250 by a data bus 256. The controller 250 can read from and write to the memory 252 via the data bus 256. The controller 250 establishes and maintains a look-up table in the memory 254, as previously described, in which each connection traversing the network element 240 is associated with its corresponding priority indicator as provided in the connection establishment request message. In the look-up table, each connection is also associated with the signalling links and network element interfaces or ports to which the connection corresponds. The look-up table in the memory 254 may contain additional information pertaining to each connection such as the traffic rate of the connection, and an identification of the source and destination for the connection. This information may also be provided to the controller 250 in the connection establishment request message.

The controller 250 is capable of detecting failures of the signalling links 246, 248. Typically, heartbeat or status messages are routinely sent over signalling links so that the status of communications on the signalling may be monitored. The absence of a heartbeat or status message may be indicative of the failure of the signalling link. The NICs 242, 244 are capable of detecting port failure and can indicate the failure of a port to the controller 250. The controller 250 runs port control software which receive messages from the NICs 242, 244 regarding the status of the ports. Once a port failure is indicated to the controller 250, the controller may direct the release of connections carried on the failed port.

Where the failure of a signalling link is detected or the failure of a port is indicated, the controller 250 releases the connections associated with such failed signalling link or port according to the methods of the preferred embodiment of the invention disclosed above. The controller 250 releases each of the connections in a sequence which corresponds to the priority hierarchy from the connection associated with the highest priority level to the connection associated with the lowest priority level, in the manner previously described. Thus, the controller 250 releases the connection associated with the failed signalling link or port, as the case may be, by compiling a release list in the memory 254 in which those connections to be released are listed in a sequence from highest priority to lowest priority. Alternatively, the release list may be compiled in a memory which is separate from the memory 254. The controller 250 then proceeds through the release list in the memory 254 and begins releasing each connection listed therein by sending a connection release message to the source or destination of the connection over a surviving signalling link associated with the connection. The controller 250 sends the connection release message to the source of a connection when the network outage occurs between the network element 240 and the destination of the connection. The controller 250 sends the release message to the destination of the connection when the network outage occurs between the network element 240 and the source of the connection. After a connection in the release list has been released, the controller 250 may update the release list by deleting that connection therefrom.

The controller 250 preferably compiles the release list in the memory 254 by inserting each connection into the release list in a location which corresponds to the level of priority of the connection. In this way, the release list in the memory 254 is always ordered in a sequence from connections having the higher levels of priority to connections having lower levels of priority and eliminates the need to perform a sort after the connections have been listed in the release list.

The memory 254 may also be used for other functions performed by the network entity. For example, the memory 254 may provide memory space for the implementation of queues in the network entity 240. Alternatively, separate memory devices may be provided for the different functions performed in the network element 240 with memory 254 only being for the look-up table and release list. It will also be appreciated that the memory 254 may alternatively be provided on a separate card in the network element 240 or be off-board the network entity 240 in a peripheral device.

The controller 250 may also perform an ordered release of connections where a reduction of bandwidth is detected by the controller 250 as opposed to a network outage. For example, a logical trunk having a variable capacity may be provided at the NIC 244. The logical trunk may carry many connections having priority levels varying from highest priority to lowest priority. As described above, each of the connections traversing the network element 240 is established by a connection establishment request message which includes a connection identifier and a priority indicator indicating the priority level of the corresponding connection. The connection establishment request message also preferably includes a traffic rate for the corresponding connection. The connection identifier, priority indicator and traffic rate for each connection are stored by the controller 250 in a look-up table in the memory 254.

When the controller 250 detects a reduction in the capacity of the logical trunk, it reduces the number of connections carried on the logical trunk by releasing a number of the connections carried thereon. Preferably, connections are only released where the capacity of the logical trunk is reduced to such an extent that the traffic rates for the connections carried on the logical trunk can no longer be guaranteed. The controller 250 determines which connections listed in the look-up table are required to be released and releases those connections in a sequence corresponding to the priority hierarchy from that connection to be released having the highest priority level to that connection to be released having the lowest priority level.

When determining which connections to release upon detection of a reduction of bandwidth, the controller 250 selects connections carried on the relevant logical trunk in a sequence which corresponds to a reverse of the priority hierarchy such that connections associated with the lowest priority level are selected for release before connections associated with higher priority levels. The controller 250 selects a number of connections for release such that the aggregate of the traffic rates of the selected connections is greater than or equal to the difference between the capacity of the logical trunk and the aggregate of the traffic rates of the connections carried on the logical trunk prior to the release.

Once connections have been selected for release by the controller 250, an ordered released list enumerating each selected connection is compiled in the memory 254 listing the selected connections in a sequence which corresponds to the priority hierarchy from the selected connection having the highest priority level to the selected connection having the lowest priority level. The controller 250 then releases each connection listed in the release list in the same sequence in which they are listed. The connections may be released by sending a release message to both the source and the destination of each connection. Where connections are released in response to a reduction in bandwidth and not the failure of a signalling link it will be appreciated that the signalling links remain and thus may be used for the transmission of release messages to both the source and destination of the connections.

Where a logical trunk is provided with the NIC 244 to connect the network element 240 to another network entity, it will be appreciated by those skilled in the art that it is not necessary for both the network entities connected by the logical trunk to release connections in response to a reduction in the capacity of the logical trunk. Thus, a protocol may be established according to which only one of the network entities connected by the logical trunk performs the release of connections in response to a reduction in capacity.

In an ATM communications network, the logical trunk may be an IMA trunk and the network element 240 may be a network entity that is connected to another network entity by the logical trunk. It is possible for either network entity to perform the release of connections in a similar manner as described above, subject to the caveat that it is not necessary for each network entity at either end of an IMA trunk to perform the release of connections in response to a reduction in capacity of the IMA trunk.

While the preferred embodiment of the invention involves compiling a separate release list in a memory, it will be appreciated that other methods for identifying the connections to be released may be employed, which methods would still fall within the scope and spirit of the present invention. For example, instead of compiling separate release lists in memory, a lookup table such as the lookup table 170 of FIG. 4 may additionally have a field for indicating whether or not a connection is to be released. When a network outage occurs, connections in the lookup table affected by the network outage may be marked "to be released" in this additional field. The additional field may simply be a single bit in memory which may be set to 1 when a connection is to be released. The release of connections in priority sequence would be accomplished by searching the lookup table 170 for connections having a HIGH release priority which are marked to be released. If no connections having a HIGH release priority are marked to be released, or if all such connections have already been released, then the lookup table 170 is searched for connections having MEDIUM release priority and which are marked to be released. This process may be repeated for each level of priority, searching first for HIGH release priority connections marked to be released, and finally for LOW release priority connections marked to be released. Another implementation is to use a linked list running through lookup table 170, organized from highest to lowest priority, of the calls waiting to be released. Calls may be added to the release linked list in priority order.

While the lookup tables and release lists have been described above as being implemented within a network entity such as the switching network element 140, those skilled in this art will understand that a lookup table or release list which is accessed externally of a network entity may also be used according to the present invention. The present invention may be applied to connection oriented communications technologies other than ATM as well. Likewise, the embodiment of the invention which has been described in relation to logical trunks in the form of IMA trunks may be applied to any physical layer having a dynamically changing bandwidth, for instance xDSL or wireless technologies. Similarly, the invention may be applied to resilient SVC's. Moreover, while the illustrated and described preferred embodiment reveals that the methods according to the present invention have been implemented within an apparatus forming part of a network element 240 which is preferably a switch, those skilled in this art will understand that the apparatus may be provided as a stand-alone device which is operatively associated with other network entities through which connections are routed in a communications network. Those skilled in this art will also understand that the present invention has been described by way of example only, and that various modifications of detail may be made thereto, all of which come within the spirit and scope thereof.

What is claimed:

1. A method for the ordered release of a subset of connections of a number of connections provided on a single logical trunk linking a first network entity and a second network entity, the logical trunk having a variable carrying capacity for said connections, the method comprising the steps of:
   (a) associating a priority indicator and a traffic rate with each of the connections the priority indicator being selected from a priority hierarchy comprised of a plurality of priority levels which varies from highest priority to lowest priority;
   (b) upon detection of a reduction of the carrying capacity of the logical trunk to a level sufficient to sustain only a reduced number of said connections, selecting from said number of connections a group of connections to be released having an aggregate capacity at least equal to said reduction in capacity of the logical trunk; and
   (c) following said selection of connections to be released, releasing every connection of said group of connections in a sequence which corresponds to the priority hierarchy from the highest priority level to the lowest priority level while maintaining the remaining connections in said number of connections not included in said selected group of connections; and
   wherein the selecting of a group of connections comprises the further steps of:
   selecting connections for release from said number of connections in a sequence beginning with the connection associated with the lowest priority level, until the aggregate of the capacity of selected connections is greater than or equal to said reduction in capacity of the logical trunk; and
   compiling an ordered release list enumerating each connection selected for release.

2. The method according to claim 1, wherein the step of compiling the ordered release list comprises the step of inserting each connection selected for release into a table in a location corresponding to the priority level associated with the connection such that the connections in the table are ordered in a sequence from the connection associated with the highest priority level to the connection associated with the lowest priority level.

3. The method according to claim 2, wherein the connection path for each connection is established by a connection establishment request message corresponding to the connection, the connection establishment request message including priority level information, traffic rate information, and information identifying a source and a destination for the corresponding connection.

4. The method according to claim 3, wherein the step of releasing the connections in said release list comprises the step of transmitting a release message to the source of a connection in said release list.

5. The method according to claim 4, wherein the logical trunk comprises a plurality of physical links.

6. The method according to claim 5, wherein the signalling communication network is an ATM communications network.

7. The method according to claim 6, wherein the logical trunk is an IMA trunk comprising a plurality physical links, and said carrying capacity is determined by the number of operative said physical links making up the IMA trunk.

8. The method according to claim 7, wherein the priority indicators and traffic rates are associated with their respective connections in a look-up table in a memory in the first network entity.

9. The method according to claim 2, wherein connections associated with a common level of priority are list in the release list in a sequence corresponding to the traffic rates of the connections.

10. The method according to claim 2, wherein connections in the release list associated with a common level of priority are ordered in sequence from the connection having the lowest traffic rate to the connection having the highest traffic rate.

11. An apparatus for the ordered release of connections carried on a logical trunk having a variable carrying capacity for said connections, the logical trunk being provided in a connection-oriented communications network between a first network entity and a second network entity and carrying a number of connections, the apparatus comprising:
    (a) a memory storing a priority indicator and a traffic rate associated with each of the connections of said number of connections the priority indicator being selected from a priority hierarchy which varies from highest priority to lowest priority;
    (b) means for selecting from said number of connections, upon a reduction of the carrying capacity of the logical trunk to a level sufficient to sustain only a reduced number of said connections, a group of connections to be released having an aggregate capacity at least equal to said reduction in capacity of the logical trunk; and
    (c) means for directing the release of every connection of said group of connections in a sequence which corresponds to the priority hierarchy from the connection of the group associated with the highest priority level to the connection of the group associated with the lowest priority level while maintaining the remaining connections in said number of connections not included in said selected group of connections; and
    wherein the selecting means selects connections for release from said number of connections in a sequence beginning with the connection associated with the lowest priority level, until the aggregate capacity of the selected connections is greater than or equal to the reduction in capacity of said logical trunk; and
    wherein the memory comprises a look-up table and each connection is stored with a priority indicator and with a traffic rate in the look-up table.

12. The apparatus according to claim 11, wherein the selecting means comprises a means for compiling an ordered release list in the memory enumerating each connection of said group of connections in a sequence which corresponds to the priority hierarchy from the connection of the group associated with the highest priority level to the connection of the group associated with the lowest priority level.

13. The apparatus according to claim 12, wherein each connection is established by a connection establishment request message, the connection establishment request message including a priority indicator, traffic rate information, an identification of a source of a corresponding connection, and an identification of a destination of the corresponding connection, wherein the priority indicator and traffic rate for each connection is obtained by the apparatus from the corresponding connection establishment request message through the connecting means.

14. The apparatus according to claim 13, wherein the directing means comprises a means for transmitting release messages, and wherein the transmitting means releases each connection in said release list by transmitting a release message to the source of a connection in said release list.

15. The apparatus according to claim 14, wherein the logical trunk comprises a plurality of physical links.

16. The apparatus according to claim 15, wherein the connection-oriented communications network is an ATM communications network.

17. The apparatus according to claim 16, wherein the logical trunk is an IMA trunk comprising a plurality physical links, and said carrying capacity is determined by the number of operative said physical links making up the IMA trunk.

18. The apparatus according to claim 17, wherein the compiling means enumerates connections associated with a common level of priority in the release list in a sequence corresponding to the traffic rates of the connections.

19. The apparatus according to claim 18, wherein the controller enumerates connections associated with a common level of priority in the release list in a sequence from the connection having the lowest traffic rate to the connection having the highest traffic rate.

20. The apparatus according to claim 15, wherein the apparatus is provided within the first network entity.

21. A method for the ordered release of switched connections from a network entity in a signaling communications network, the switched connections being routed across the communications network along respective connection paths established therefor between source and destination entities in response to a connection establishment request message propagated over a signaling link, the connection paths each traversing the network entity via network entity interfaces provided with the network entity through which said connections are routed, and wherein the source entities initiate re-establishment of the connections in the event of connection failure in the order in which connection release messages are received thereby, the method comprising the steps of:
  associating a priority indicator with each of the switched connections, the priority indicator being selected from a priority hierarchy comprised of a plurality of priority levels which varies from highest priority to lowest priority; and
  upon detection of failure, due to a network outage, of a signaling link or port which is associated with a number of switched connections, propagating connection release messages from the network entities on either side of the failure respectively toward the source entity and destination entities for every switched connection of said number of switched connections which the failure of said signaling link or port has disrupted whereby the switched connections are progressively released at each network entity traversed as the connection release messages propagate out toward the source and destination entities; and
  and wherein said connection release messages are sent toward said source or destination entity in a sequence which corresponds to the priority hierarchy from the switched connection associated with the highest priority level to the connection associated with the lowest priority level; and
  wherein the step of releasing the connections comprises the steps of:
  compiling, upon detection of said failure of said signaling link or part, an ordered release list comprising every connection of said number of switched connections; and
  releasing the switched connections in the ordered release list in a sequence which corresponds to the priority hierarchy from the connections associated with the highest priority level to the connection associated with the lowest priority level.

22. The method according to claim 21, wherein the compiling of the ordered release list comprises the steps of inserting each connection of said number of connections into a table in a location corresponding to the priority level associated with the connection such that the connections in the table are ordered in a sequence from the connection associated with the highest priority level to the connection associated with the highest priority level.

23. The method according to claim 22, wherein the connection establishment request message includes the priority indicator, an identification of a source of the corresponding connection, and an identification of a destination of the corresponding connection.

24. The method according to claim 23, wherein the priority indicators are associated with their respective connection in a look up table in a memory in the network entity.

25. The method according to claim 21, wherein the signaling communications network is an ATM communications network.

26. The method according to claim 25, wherein each connection is associated with a traffic rate, and connections associated with a common level of priority are listed in the release list in a sequence corresponding to the traffic rates of the connections.

27. The method according to claim 26, wherein connections in the release list associated with a common level of priority are ordered in sequence from the connection having the highest traffic rate to the connection having the lowest traffic rate.

28. An apparatus for the ordered release of switched connections in a signaling communications network, the switched connections being routed across a network entity in the communications network along respective connection paths therefor between source and destination entities in response to an establishment request message propagated over a signaling link, and wherein the source entities initiate re-establishment of the connections in the event of connection failure in the order in which connection release messages are received thereby, the connection paths each traversing the network entity via network entity interfaces provided with the network entity and through which said connections are routed, the apparatus comprising:
  (a) a memory for storing a priority indicator associated with each of the switched connections, the priority indicator being selected from a priority hierarchy which varies from highest priority to lowest priority;

(b) said memory comprising a look-up table and each connection being stored with a priority indicator in said look-up table;

(c) means for directing the sending of connection release messages for every connection of a number of switched connections toward said source and destination entities upon failure of a signaling link or a port associated with said number of switched connections from the network entities on either side of the failure, and said connection release messages being sent in a sequence corresponding to the priority hierarchy from the connection associated in the storing means with the highest priority level to the connection associated in the storing means with the lowest priority level; and (d) said directing means compiling an ordered release list in the memory upon indication of the network outage to the apparatus, the compiling means enumerating in the ordered release list every connection of said number of connections in order from the connection associated with the highest priority level to the connection associated with the lowest priority level.

29. The apparatus according to claim 28, wherein each connection is established by a corresponding connection establishment request message received by the network entity, the connection establishment request message including a priority indicator, an identification of a source of the corresponding connection, and an identification of a destination of the corresponding connection, wherein the priority indicator for each connection is obtained by the apparatus from the corresponding connection establishment request message through the connecting means.

30. The apparatus according to claim 28, wherein the network outage is a failure of a signaling link corresponding to said number of connections, said signaling link being for communicating administrative information concerning operation of said number of connections.

31. The apparatus according to claim 30, wherein the signaling communications network is an ATM communications network.

32. The apparatus according to claim 31, wherein each connection is associated in said look-up table with a traffic rate, and the compiling means lists connections associated with a common level of priority in the release list in a sequence corresponding to the traffic rates of the connections.

33. The apparatus according to claim 28, wherein the compiling means enumerates connections associated with a common level of priority in the release list in sequence from the connection having the highest traffic rate to the connection having the lowest traffic rate.

* * * * *